Jan. 3, 1967 R. L. CHRISTIANSEN 3,295,557
HOSE
Filed July 15, 1963

INVENTOR.
ROBERT L. CHRISTIANSEN
BY
ATTORNEY

United States Patent Office 3,295,557
Patented Jan. 3, 1967

3,295,557
HOSE
Robert L. Christiansen, Clarence, N.Y., assignor, by mesne assignments, to Hewitt Robins, Stamford, Conn., a corporation of Delaware
Filed July 15, 1963, Ser. No. 295,611
4 Claims. (Cl. 138—125)

This invention relates to flexible, fluid-carrying hoses of the type commonly referred to as submarine hose. More particularly, the invention relates to a submarine hose that will sink when not in use and will float when in use.

It is known to provide hoses for ship-to-shore or vice-versa transfer of fluids where docking facilities are not feasible or otherwise not provided.

Hose of the type employed for this service is usually referred to in the art as submarine hose. It remains immersed when in use as well as when it is not in use.

Heretofore it was considered preferable to make submarine hose of great strength and of considerable weight per foot as contrasted with other hose of similar size. Great strength was thought necessary to insure full flow diameter as well as to resist external and internal pressures. A heavy hose was desirable in order to insure that the hose would remain at the bottom. The latter provides maximum safeguard against damage from waves, vessels and climatic conditions.

However, it naturally follows that it is difficult to inspect a hose laying at the bottom. It is extremely difficult to detect any leakage that might occur during use. This is in some respects due to the great variance in the amount of supervision given to the discharging or receiving of oil from or to shore. But, even with good supervision leakage can often not be detected till long after the event. Because of the difficulty in inspecting and detecting leakage, much oil and other materials have been lost. Furthermore, considerable contamination of waters and shore lines, with resulting destruction to plant and marine life has occurred. It has even been known for substantially an entire ship-load of oil to be discharged into a harbor before being detected. This, as can be well imagined, causes great consternation and embarrassment to oil firms, as well as those living near shore. According to the instant invention these inspection difficulties and the danger of leakage and resulting disputes and embarrassments can be overcome. Leakage can be readily detected almost immediately upon occurrence. Nonetheless, a hose is provided which will rest upon the ocean floor when not in use and like the heretofore known hoses, be as far away from danger as possible.

In accordance with the instant invention there is provided a hose which, unlike the heretofore known submarine hose, will float during the period in which it is being used for the conveyance of fluids such as aviation gasoline, jet fuel and the like. However, the hose is also constructed so that when not in use it will sink to the bottom. Thus a hose made in accordance with the instant invention will be in view when it is in use and any leak can be quickly detected. This will greatly minimize losses and damage to shore line and marine line. However, the hose itself will not be subject to damage by boats, etc. when it is not in use as it will sink to the bottom.

Another advantage of a hose constructed according to the instant invention is that it can be readily inspected.

One object of the instant invention is to provide a hose having the advantages set forth in the preceding paragraph. Another object is to provide a hose which when emptied will collapse under the influence of atmospheric pressure approximating that of sea level. Since a hose constructed according to the instant invention will collapse when it is evacuated its displacement of the fluid within which it is floating or immersed can be decreased considerably as compared to its displacement when it is expanded. This can be readily accomplished whenever desired. One object of the instant invention is to provide a hose which, when expanded and in use, will displace a weight of water equal to that of the hose and the fluid being carried by the hose, yet which when not in use will collapse, and have a displacement that will be less than that necessary to maintain it in suspension in the water.

The objects of the invention include providing hose lengths, including coupling elements wherein the characteristics of the hose are such that its combined weight, including the weight of the fluid it may be carrying, is less than the weight of water in which the hose is immersed. Yet as stated above, the hose will collapse intermediate the couplings when empty and under the influence of atmospheric pressure. Then its displacement will be insufficient to support it and the hose will sink to the bottom.

In addition, and in corollary to the above objects, one object is to provide a hose which is of such light weight and so highly flexible and pliable relative known hoses useful for a similar purpose that it can be more easily coiled and uncoiled and stored on reels. This will facilitate transfer from place to place and placement into or out of service. This object will provide a hose which is suitable for sporadic use or intermittent use which can be, for example, carried on shipboard or located at a shore installation or on a movable device along the shore. It can be coiled and uncoiled when it is needed to be used. It can be stored in relatively smaller coils as compared to heretofore known hoses for the same service.

Yet another object of the invention is to provide a hose which does not exhibit radial or longitudinal expansion in excesses of that which is acceptable for a much heavier hose constructed for comparable usage.

As stated above, the hose according to the invention will be particularly useful as an improved submarine hose for ship to shore discharge of aviation gasoline, jet fuel, etc. However, its usefulness is not necessarily so limited in view of its light weight construction, and flexibility. Further the hose can be even more economically manufactured than prior hoses for similar use.

One other object of the invention, more specifically stated than above, is to provide submarine hose which can be collapsed under minor negative internal pressure (a differential pressure on the order of 20 p.s.i.) so that it will sink. Yet when in normal operation, conveying fluids having a specific gravity not substantially greater than 0.85, the hose will be buoyant in salt and fresh water.

Another object of the invention is to provide a collapsible, inexpensively constructed, light weight, and therefore portable, floating and sinking hose suitable for use in lieu of the known "submarine hose."

Additional objects and advantages will become apparent from the following description and the accompanying drawings wherein.

Figure 1:
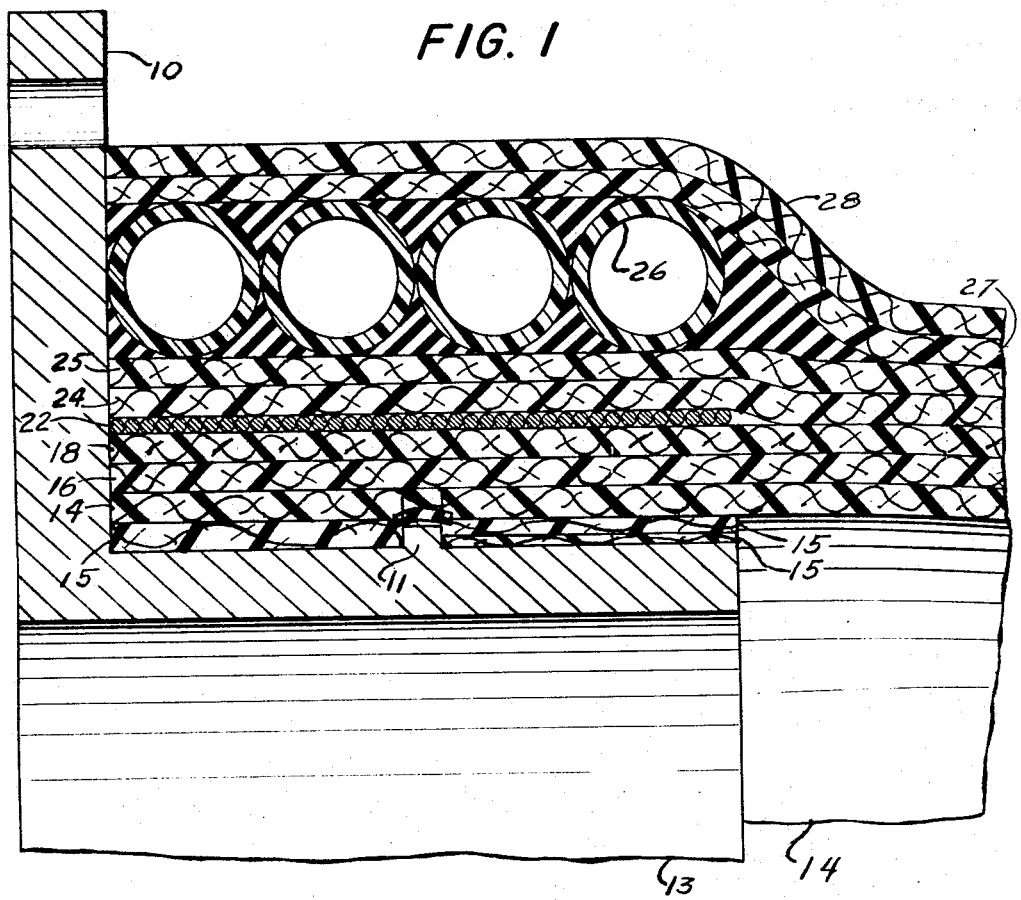
FIGURE 1 shows a fragmentary cross-sectioned view of a hose section including a nipple constructed according to the invention. Both ends of the section are identical, thus for simplicity only one end is shown.

A hose constructed according to the instant invention has the property of being buoyant when carrying fluid such as gasoline, yet non-buoyant when evacuated. This is achieved by providing a hose wherein the wall structure is such that it will normally collapse when exposed to atmospheric pressure and not provided with any internal pressure exceeding atmospheric. In other words, the hose wall is not self-supporting. A hose constructed according to the instant invention will have an inner and outer diameter, and a wall thickness and weight such that it will displace its own weight and the weight of the fluid being conveyed thereby when inflated by the fluid and when the hose is placed in a body of water. This is true for a hose identical with that shown in the drawing for conveyed fluids having specific gravities not greatly exceeding .85.

The hose is further constructed so that the weight of the nipple will not interfere with this relationship. This is accomplished, as will be hereinafter apparent, by providing a nipple such as a metallic nipple with means for displacement of sufficient amounts of the water within which the hose is immersed so that the nipple's influence on the buoyancy characteristics of the hose will become negligible; i.e., the nipple end of the hose is constructed so that, considering its total weight, its displacement will be approximately that of the weight of the nipple end. Thus the nipple end becomes, approximately speaking at least, a negative factor in the tendency of the hose to float or sink. At least its influence is considerably diminished. With hose constructed in the usual lengths in which such hoses are provided, from 20 feet to 50 feet, the major determinant of whether the hose section will float or sink is thus whether or not the carcass of the hose extending between the nipples is collapsed or is expanded to full size.

Although there is disclosed herein a hose having a specific construction, it will be understood by those skilled in the art that other means than those disclosed herein and other types of fabric construction can be employed within the scope of the invention. There is no specific limitation to particular types of fabrics, either synthetic or natural or synthetic or rubbery compounds or specific plastic or other compounds or materials intended by employment of the specific embodiment illustrated. The invention relates to providing a hose which will float when in use and sink when not in use.

Figure 2:
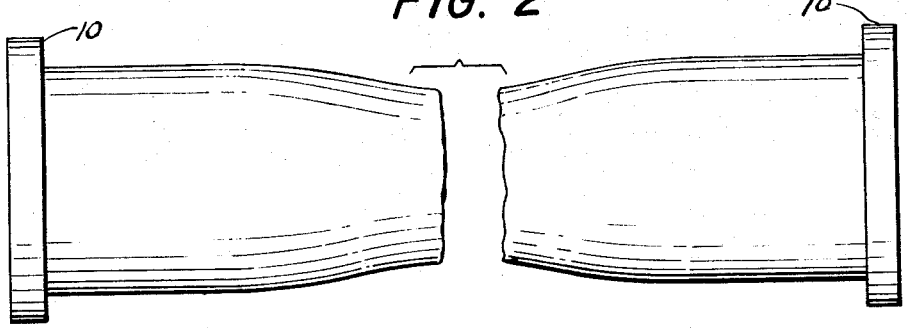
FIGURE 2 is a side elevational view of the hose constructed according to the invention.

With particular reference to the drawings, in FIGURE 2 there is shown a hose constructed according to the invention. This hose, as is commonly provided, has a pair of nipple ends, each of which carries a nipple 10. The nipple in this instance is an aluminum member formed as a single piece in accordance with modern practice. With reference to FIGURE 1, it will therein be noticed that the nipple has a circular rib 11. As will be known to those skilled in the art, it may have one or more such ribs. The rib 11 is formed integrally with the nipple. The hose is built up over this nipple. In this instance the hose that is built up on the nipple comprises an inner tube 14 designed to carry the fluids for which the hose is intended to be used. As will be seen in FIGURE 1, layers such as 15 of nipple stock are applied over the nipple. In this particular instance actually two layers are placed adjacent the inner end (skirt) 13 of the nipple, one layer is applied near the flange, and two are applied over the rib 11. Drawing limitations prevent showing all the layers referred to. However, those skilled in the art will readily recognize that many changes can be made in regard to the number or thickness or weight of the layers used in building the hose body. A hose inner tube 14 is cemented to the nipple stock over the full length of the skirt 13. The inner tube is of a suitable known rubber composition, for example, Buna N compound used for inner tubes of hoses conducting aircraft fuels. Of course, any other suitable composition of rubber or other material could be utilized. In the presently preferred embodiment a plied Buna N inner tube 14 is found to be satisfactory.

Layers such as 16–18 of nylon cord fabric and rubber, a construction of the type used, for example for tire carcass, are placed over the entire length of the hose. Actually it should be pointed out that the layers of rubber and fabric are exaggerated in size in FIGURE 1 to show them more clearly. True scaling of the elements with respect to each other could not be maintained due to drawing limitations. The nylon cord plies 16 and 18, each of which may be of a plied construction are spirally wound, alternately in a clockwise and counter-clockwise direction; i.e., if ply 16 is wound in a clockwise direction ply 17 will be wound in a counter-clockwise direction and so on if more than two plies are used. The nylon cord is secured with any suitable known rubber cement and each lap of nylon cord is staggered (the butt joint of adjoining strands of layer 16 is covered by a strand of the layer 18) for added strength according to known practices.

A final layer of nylon cord or sheeting, if desired, is applied over the nipple only (not shown). It need not extend the whole length of the hose body. A spring steel wire 22 is tightly wound on this sheeting or the ply 18 as shown in the drawing over the entire length of the nipple, but no further. The steel wire helps maintain the nipple-carcass connection in a manner known in the art. Cement is applied over the wire and then rubber cover stock such as 24 is applied thereto. An additional layer of cover stock is designated 25.

Hollow plastic tubing 26 is next wound over the length of the nipple. The hollow tubing size and amount of tubing is selected in accordance with the weight and size of the nipple end. In the illustrated instance the tubing has the following characteristics: .375" O.D., .250" I.D. It is of a synthetic material commonly sold under the trademark "nylon." The exact composition is not at all important. The tubing is selected to give proper buoyancy for the nipple ends. The tubing has weight-displacement ratio such that it will readily float by itself. As a result it adds displacement or buoyancy to the nipple ends greater than its (the tubing's) own weight. Extra rows of tubing (one over the other) can be used to increase the exterior diameter and thus the displacement of the nipple end. Larger diameter tubing can be used for the same purpose. Preferably this tubing is closely wound (and may be slightly spaced from the nipple flange) and each end is sealed or closed. The nylon tubing is then cemented and covered with a suitable rubber cover stock 27. The plies and cover stocks are each approximately .05" thick.

A nylon breaker 28 is wound from one flange of the hose length to the flange at the other end of the hose length and cemented in place.

The above described assembly of this invention may be covered with any known suitable lightweight hose fabric cover and the hose cured and vulcanized in a known manner. Suitable rubber (friction) is placed between plies and coils of tubing and the plies and tubing united in one rubbery body as known in the art.

The hose described and illustrated herein has an 8" inside diameter and an 8.8" outside diameter. It is made of nylon cord fabric and suitable impregnating rubbery compounds, but has no stiff reinforcing. The hose body including the inner tube and plies, is not made self-supporting. Instead, the construction is such that it will collapse, as a fire hose will, in atmospheric pressure. If placed on a flat surface as a fire hose on the street it will collapse. It cannot support itself. Thus whenever evacuated in the presence of atmospheric exterior pressure it will collapse. The weight of the hose is such that when collapsed this hose will not displace a sufficient amount of water to cause it to float. It will instead sink to the bottom.

The nipple ends, however, are made so that they will displace their weight in water. This is accomplished by use of the tubing 26. It will be readily understood that there are many variables involved in producing a particular hose according to the invention.

The following data for one specific hose constructed according to the invention will serve as an example of the specific method of determining proper size-weight relationship for any hose for which the nipple ends have been made of a size such that they will approximately displace their own weight in fresh water. The tubing used for this purpose was as stated above a nylon tube having both ends sealed as by "welding."

The internal diameter selected for this example is 8". The length, including nipples, is 25 feet. The material to be conveyed is fuel oil having a specific gravity of .85. Since, as indicated above, the nipple ends are of no consideration, for they remain full size at all times and displace approximately their own weight, the major consideration is what does the hose carcass weigh and what does it displace.

The hose constructed according to the disclosed form to perform the service for which it is intended has a weight per foot of 5.30 lbs.

Thus the total weight of the per foot hose full of fluid and which must be displaced to float the hose is:

|  | Lbs. |
|---|---|
| Weight of .85 sp. gr. fluid per foot (8" cylinder) | 18.57 |
| Weight of hose per foot | 5.30 |
| Total | 23.87 |

The buoyancy factor, i.e., the force tending to buoy the inflated hose, equals the weight of water displaced. The 8" size hose has an outside diameter of 8.74". Thus the buoyancy factor in water of a weight of 62.4 lbs. per cubic foot is equal to:

Volume × 62.4 lbs./foot of length

This becomes .417 × 62.4 = 26.02 lbs.

The difference between the weight displaced and the total weight is the floating force; i.e., the forces in excess of its weight. This is:

26.02
−23.87
‾‾‾‾‾
2.15 lbs. ft.

For a 12" hose of the same construction:

The weight of hose per foot is 10.6 lbs.
The weight of fluid carried per foot is 41.6 lbs.
The total sinking force is 52.2 lbs.
The buoyancy factor is: 62.4 times displacement per foot: 62.4 × .932 equals 58.16 lbs.
The floating force therefore is 5.86 lbs./foot.

In both instances the displacement of the hose when collapsed is far less than the weight per foot of the hose. As a result, again remembering that the nipple ends are a negative factor, the hose will sink when it is collapsed.

From the above it will be seen that the hose will float when it is being used, but will sink when not in use. This provides a hose with which, if leakage occurs during use, it can be more readily and more instantly detected since the hose will be floating on the surface. The hose can also be easily inspected by simply filling it with fluid under pressure. It will then float and can be inspected before use. However, when not in use the hose can be collapsed by evacuating it. It will then sink to the bottom.

While I have shown and described a preferred form of my invention, it will be understood by those skilled in the art that many changes in details and forms may be made within the scope of the appended claims, and accordingly I claim an exclusive right to all which come within the scope of the appended claims.

I claim:

1. A method of conveying fluids over a body of water employing a hose which has a total weight in excess of the water it displaces when in a collapsed state and which displaces a volume of water at least equal to the total weight of said hose when inflated and conveying a fluid; comprising the steps of collapsing said hose by creating a differential pressure between the interior and exterior thereof whereby said hose will be unable to displace its weight and will sink, and inflating said hose while conveying a fluid therein whereby said hose will displace its weight and the weight of said fluid and will float.

2. A method of conveying fluids over a body of water employing a hose which has a total weight in excess of the water it displaces when in a collapsed state and which displaces a volume of water at least equal to the total weight of said hose when inflated and conveying a fluid; comprising the steps of collapsing said hose by creating a differential pressure between the interior and exterior thereof on the order of 20 p.s.i. whereby said hose will be unable to displace its weight and will sink, and inflating said hose while conveying a fluid therein having a specfic gravity not substantially greater than .85 whereby said hose will displace its weight and the weight of said fluid and will float.

3. A vulcanized floating and sinking hose comprising a nipple at each end, inner tube means secured to each said nipple and extending therebetween, a plurality of synthetic resin strips spirally wrapped about said inner tube in alternate clockwise and counterclockwise directions, wiring means for securing said strips and tube to said nipple, a hollow tubular member closed at each end closely spirally wrapped about said resin strips over said nipple only, and cover means for the foregoing assembly, said hose having a total weight in excess of the weight of water said hose displaces when collapsed and when said hose is expanded it displaces a volume of water which exceeds said total weight.

4. A nipple assembly for floating and sinking hose comprising an aluminum nipple having a rib outstanding from the skirt of said nipple, nipple layer stock cemented to said skirt and over said rib, a hose inner tube cemented to said layer stock, a plurality of synthetic resin strips spirally wound about said inner tube over the length thereof in alternate clockwise and counterclockwise direction, sheeting stock over said spirally wound strips extending over the length of said skirt, wire windings on each side of said rib securing said spirally wound strip and said inner tube to said nipple, sheeting material over said wire, a hollow tubular member closed at both ends closely wound over said last-named sheeting over the length of said skirt, and means covering said tubing, friction material spirally wrapped over the length of said hose and hose covering material extending over the length of said hose.

References Cited by the Examiner

UNITED STATES PATENTS

| 1,970,513 | 8/1934 | Knowland | 138—109 X |
| 2,035,736 | 4/1936 | Baird | 138—119 |
| 2,447,697 | 8/1948 | Gotschall | 138—109 X |
| 2,749,943 | 6/1956 | Nemeth | 138—125 |
| 2,923,954 | 2/1960 | Babcock | 138—103 X |
| 3,047,026 | 7/1962 | Kahn | 138—121 X |

LAVERNE D. GEIGER, *Primary Examiner.*

L. J. LENNY, *Examiner.*

T. MOORHEAD, *Assistant Examiner.*